(12) United States Patent
Shukla et al.

(10) Patent No.: US 10,380,519 B2
(45) Date of Patent: Aug. 13, 2019

(54) TICKET SOLVER SYSTEM

(71) Applicant: Accenture Global Services Limited, Dublin (IE)

(72) Inventors: Arpan Shukla, Chennai (IN); Bhaskar Ghosh, Bangalore (IN); Rajendra T. Prasad, Bangalore (IN); Vijayaraghavan Koushik, Chennai (IN); Siddharth Mehta, Mumbai (IN); Priya Athreyee, Chennai (IN); Sandeep Rathod, Mumbai (IN)

(73) Assignee: Accenture Global Services Limited, Dublin (IE)

( * ) Notice: Subject to any disclaimer, the term of this patent is extended or adjusted under 35 U.S.C. 154(b) by 1103 days.

(21) Appl. No.: 14/669,330

(22) Filed: Mar. 26, 2015

(65) Prior Publication Data

US 2016/0283889 A1 Sep. 29, 2016

(51) Int. Cl.
*G06Q 10/06* (2012.01)

(52) U.S. Cl.
CPC .......................... *G06Q 10/063114* (2013.01)

(58) Field of Classification Search
CPC ............................................. G06Q 10/063114
USPC ....................................................... 705/7.15
See application file for complete search history.

(56) References Cited

U.S. PATENT DOCUMENTS

| | | | |
|---|---|---|---|
| 8,028,197 B1 | 9/2011 | Barua et al. | |
| 2006/0200371 A1 | 9/2006 | Spector et al. | |
| 2009/0063387 A1 | 3/2009 | Beaty et al. | |
| 2015/0113628 A1* | 4/2015 | Deshmukh | H04L 41/5074 726/10 |

(Continued)

FOREIGN PATENT DOCUMENTS

| | | |
|---|---|---|
| CN | 102708431 A | 10/2012 |
| CN | 102770877 A | 11/2012 |

OTHER PUBLICATIONS

Johnson, "NOC Internal Integrated Trouble Ticket System Functional Specification Wishlist ("NOC TT Requirements")," Internet Engineering Task Force, https://tools.ietf.org/html/rfc1297, Jan. 1992, 12 pages.

*Primary Examiner* — Eric W Stamber
*Assistant Examiner* — Hector Leal
(74) *Attorney, Agent, or Firm* — Harrity & Harrity, LLP

(57) ABSTRACT

A device may identify a ticket associated with an issue, a user associated with resolving the issue, and a particular business process including a particular business process step associated with the issue. The device may present information regarding a particular business process workflow, corresponding to the particular business process, associated with a business process steps. The device may identify the particular business process step from the business process steps, and may identify a particular technical solution corresponding to the particular business process step. The device may present information regarding a particular technical solution workflow, corresponding to the particular technical solution, associated with technical solution steps. The device may identify a particular technical solution step, from the technical solution steps, associated with resolving the issue. The device may update a resolution history based on identifying the particular business process, the particular business process step, and the particular technical solution step.

20 Claims, 10 Drawing Sheets

(56) References Cited

U.S. PATENT DOCUMENTS

2015/0348051 A1* 12/2015 Bodda ................... G06Q 10/06
  705/304
2016/0027019 A1* 1/2016 Michaelangelo .... G06Q 30/016
  705/7.26

* cited by examiner

| Business Process | Business Process Step | Message | Ticket | Sent From | Created On | Status |
|---|---|---|---|---|---|---|
| Process 1 | Step 1 | Step 1 gives error: "Opti... | P1-T18 | Automated | 11/15/2014 | New |
| Process 1 | Step 2b | This feature isn't workin... | P1-T17 | Automated | 11/14/2014 | Open |
| Process 1 | Step 2b | Can't identify the problem | P1-T16 | User 2 | 11/14/2014 | Escalated |
| Process 1 | Step 3 | Proposed step rejected | P1-T10 | User 3 | 11/14/2014 | Returned |
| Process 1 | Step 2b | Bug fix implemented | P1-T15 | User 3 | 11/13/2014 | Resolved |
| Process 1 | Step 3 | Resolved at level 3 | P1-T14 | User 2 | 11/13/2014 | Resolved |
| Process 1 | Step 2b | Proposed step accepted | P1-T12 | User 2 | 11/12/2014 | Resolved |
| Process 1 | Step 3 | Re-assignment | P1-T13 | Automated | 11/12/2014 | Resolved |
| Process 1 | Step 2b | Ticket resolved | P1-T9 | Automated | 11/11/2014 | Resolved |
| Process 1 | Step 3 | Updated Business Proc... | P1-T13 | User 3 | 11/10/2014 | Resolved |
| Process 1 | Step 3 | Fixed process error | P1-T9 | User 2 | 11/10/2014 | Resolved |

FIG. 5C

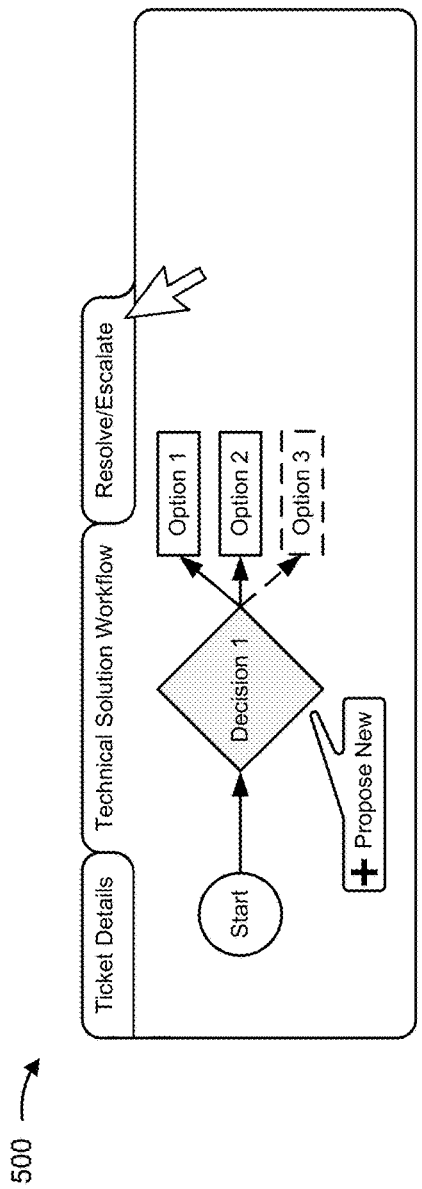

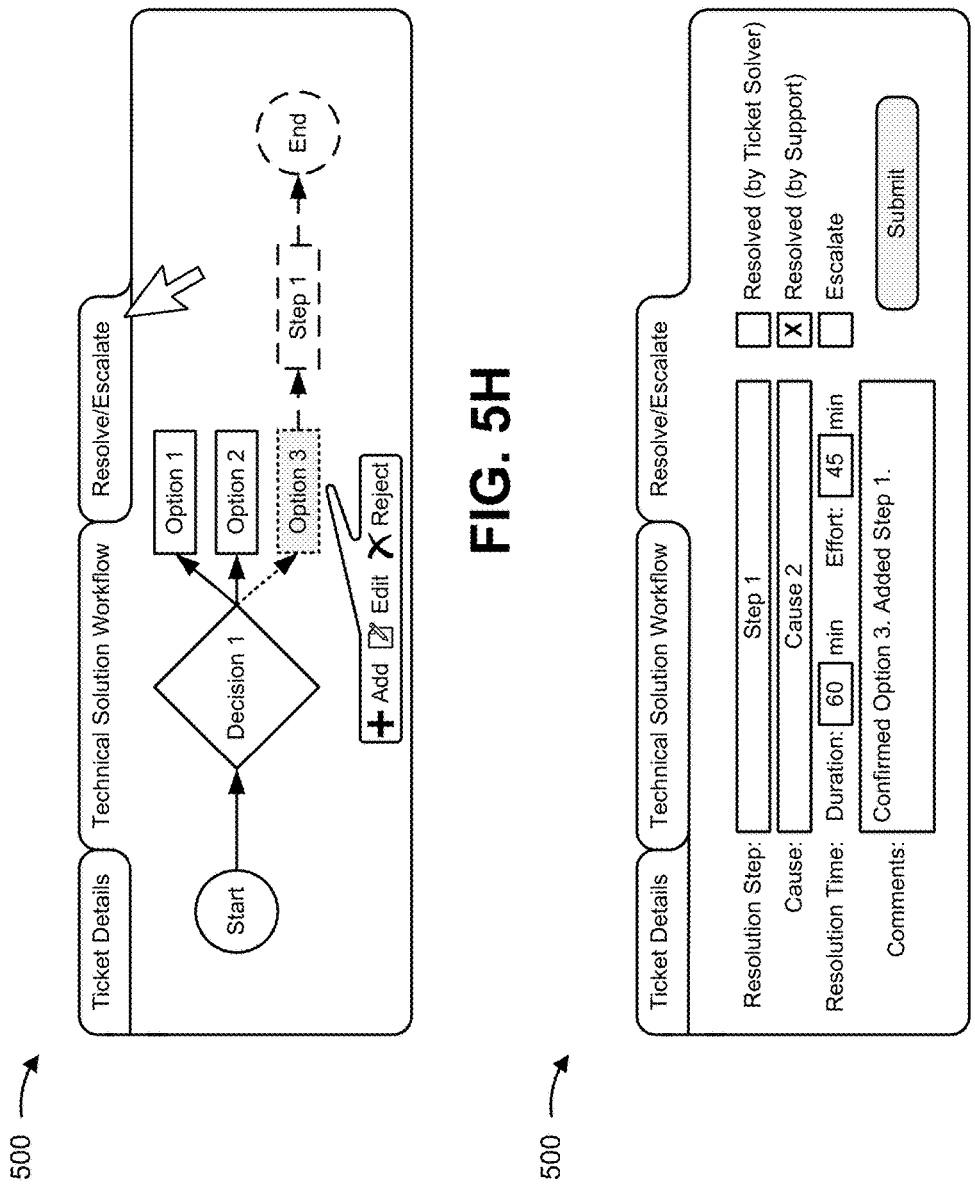

TICKET SOLVER SYSTEM

BACKGROUND

A customer service team may implement an issue tracking system to facilitate the reporting, management, and resolution of various issues. Implementing an issue tracking system may include generating and updating support tickets to identify the issues and their statuses. An issue tracking system may also include a knowledgebase to assist service team members in solving the issues.

SUMMARY

According to some possible implementations, a device may identify a ticket associated with an issue to be resolved. The device may identify a user associated with resolving the issue. The device may identify, based on the ticket, a particular business process that includes a particular business process step associated with causing the issue. The device may present, for display via a user interface, information regarding a particular business process workflow corresponding to the particular business process. The particular business process workflow may be associated with a group of business process steps. The device may identify the particular business process step from the group of business process steps, and may identify a particular technical solution corresponding to the particular business process step. The device may present, for display via the user interface, information regarding a particular technical solution workflow corresponding to the particular technical solution. The particular technical solution workflow may be associated with a group of technical solution steps. The device may identify a particular technical solution step from the group of technical solution steps. The particular technical solution step may be associated with resolving the issue. The device may update a resolution history based on identifying the particular business process, the particular business process step, and the particular technical solution step.

According to some possible implementations, a computer-readable medium may store instructions that, when executed by a processor, cause the processor to output, via a user interface, output information based on a knowledgebase and a resolution history. The output information may be associated with presenting a business process workflow corresponding to a business process, and presenting a technical solution workflow corresponding to a process step associated with implementing the business process. The instructions may cause the processor to receive, via the user interface, input information associated with identifying an issue associated with using an application to implement the business process, input information associated with identifying the business process, where the process step is associated with implementing the business process, and input information associated with a resolution step associated with implementing the technical solution workflow. The instructions may cause the processor to generate the business process workflow, corresponding to the business process, based on the input information. The instructions may cause the processor to generate the technical solution workflow, corresponding to the process step associated with implementing the business process, based on the input information. The instructions may cause the processor to update the resolution history based on the input information. The resolution history may identify the issue, the business process, the process step, the technical solution workflow, and the resolution step. The instructions may cause the processor to update the knowledgebase based on the resolution history.

According to some possible implementations, a method may include identifying, by a device, an issue to be resolved. The method may include determining, by the device and based on identifying the issue: a set of resolved issues associated with the issue, one or more metrics associated with the set of resolved issues, one or more causes associated with the set of resolved issues, one or more resolutions associated with the set of resolved issues, and one or more suggestions based on the one or more causes and the one or more resolutions. The one or more suggestions may be associated with resolving the issue. The method may include presenting, by the device, output information including: information associated with a business process workflow of a set of business process workflows, information associated with a set of technical solution workflows identified in the knowledgebase, and information associated with identifying a particular technical solution step, of the set of technical solution steps, for resolving the issue, including: the one or more metrics, the one or more causes, the one or more resolutions, and the one or more suggestions. The business process workflow may correspond to a business process of a set of business processes identified in a knowledgebase. The business process may include a set of business process steps. The set of technical solution workflows may correspond to the set of business process steps. Each technical solution workflow, of the set of technical solution workflows, may include a set of technical solution steps. The method may include receiving, by the device and via the user interface, input information including information associated with implementing the particular technical solution step. The method may include updating, by the device and based on the input information, a resolution history to identify: the business process associated with the issue, one or more business process steps of the set of business process steps including a particular business process step, a particular technical solution workflow, of the set of technical solution workflows, corresponding to the particular business process step, and one or more technical solution steps, of the set of technical solution steps, associated with the particular technical solution workflow. The one or more technical solution steps may include the particular technical solution step. The method may include determining a resolution status associated with the issue. The method may include updating, by the device, the knowledgebase based on the resolution history and the resolution status.

BRIEF DESCRIPTION OF THE DRAWINGS

FIGS. 5A-5I are diagrams of an example implementation relating to the example process shown in FIG. 4.

DETAILED DESCRIPTION

The following detailed description of example implementations refers to the accompanying drawings. The same reference numbers in different drawings may identify the same or similar elements.

Members of a customer service team may employ a ticket management system and a knowledgebase associated with the ticket management system to create, track, and solve problem tickets for issues which clients encounter. For example, a ticket management system and its knowledgebase may guide a customer service team member and/or a client through a series of steps to solve a problem associated with a software (or other) application. However, as applications supported by the customer service team become more complex, the knowledgebase may become correspondingly (or even exponentially) more difficult, expensive, or time consuming to build, maintain, or use. A customer service team member may require extensive training to be able to resolve tickets using such a knowledgebase.

An integrated ticket solver system, which combines the ticket resolution process with the creation and maintenance of the knowledgebase, may reduce both the cost and effort associated with providing customer service to a client. Organizing the knowledgebase into business processes, with technical solutions linking to corresponding steps of the business processes, may reduce the level of knowledge required to leverage the knowledgebase to resolve a ticket. Presenting the business processes and technical solutions, to users of the ticket solver system, as graphical workflows may reduce the time and effort required to navigate the knowledgebase. Collaborative creation and maintenance of the knowledgebase through workflow suggestions made by users during the resolution process may increase both the efficiency and effectiveness of the ticket solver system. Automatic analysis of ticket records may assist users with identifying common causes of and solutions to clients' issues and may likewise identify knowledgebase deficiencies. Such a ticket solver system may be particularly advantageous when implemented, e.g., to provide support for software applications which automate, to at least some degree, one or more business-related processes.

Figure 1:
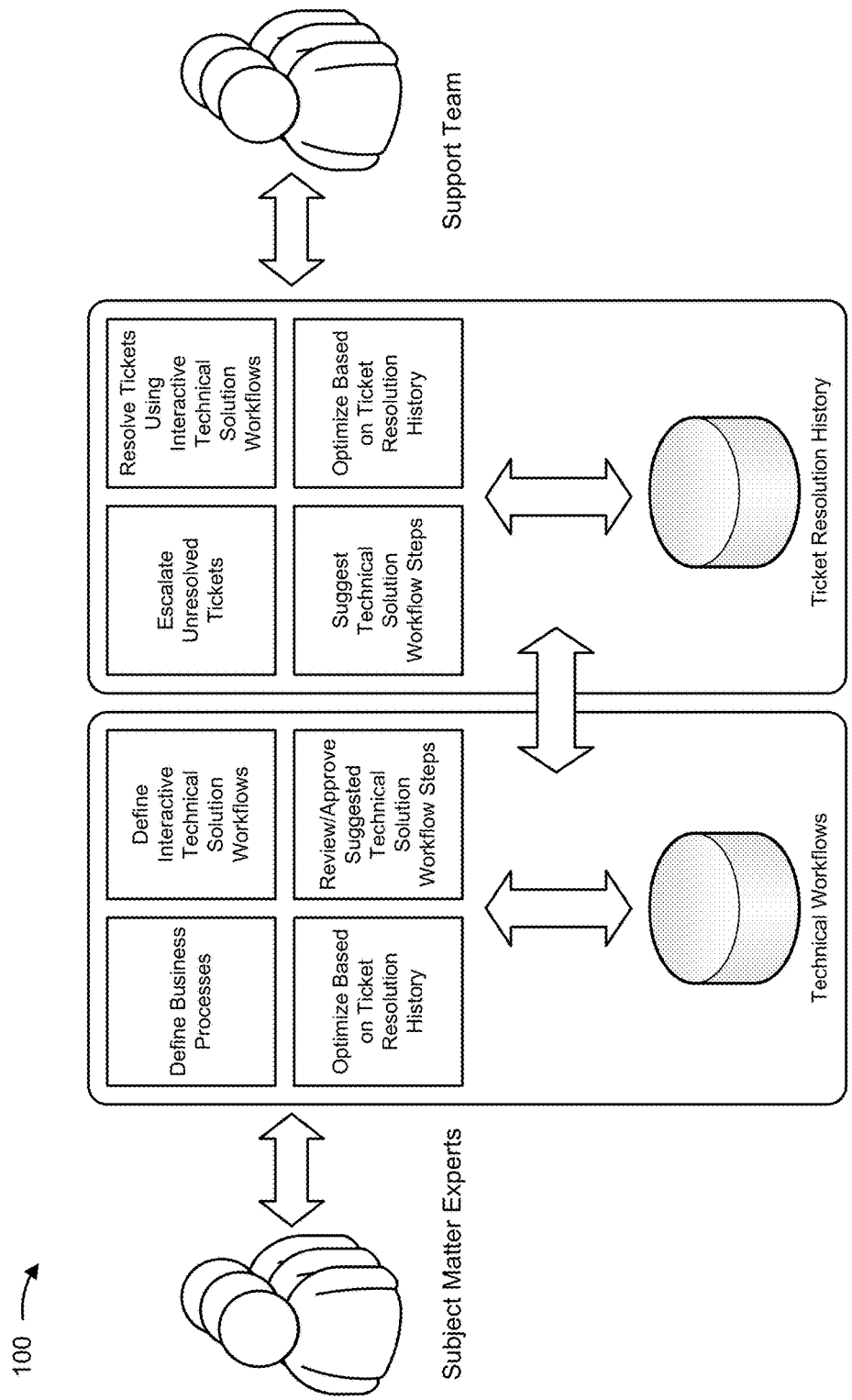
FIG. 1 is a diagram of an overview of an example implementation described herein.

FIG. 1 is a diagram of an overview of an example implementation 100 described herein. As shown in FIG. 1, members of a support team may interact with a ticket solver system to resolve support tickets and suggest improvements to a knowledgebase. The members of the support team may resolve tickets by following interactive technical solution workflows, presented by the ticket solver system, corresponding to business process steps associated with tickets. If a member encounters an issue with resolving a ticket using a technical solution workflow, the member may suggest additions or modifications to the technical solution workflow. The member may escalate unresolved tickets and/or suggestions to another member or to a subject matter expert who may be better able to resolve the ticket and/or approve the suggestion. When a member performs an action associated with a ticket (e.g., resolving or escalating the ticket and/or making a suggestion), the ticket solver system may update a ticket resolution history. The ticket solver system may analyze information included in the ticket resolution history to optimize the support team's use of the ticket solver system (e.g., by identifying likely causes and/or solutions for a particular ticket based on causes and/or solutions associated with other tickets).

Subject matter experts may interact with the ticket solver system to resolve tickets and create and/or maintain the knowledgebase. Subject matter experts may provide the ticket solver system with definitions for business processes implemented by applications used by clients whose tickets are to be resolved. For each step of the business processes, the subject matter experts may define an interactive technical solution workflow for resolving tickets associated with performing the step of the business process. The subject matter experts may review and approve suggestions, to modify the technical solution workflows, proposed by members of the support team. The ticket solver system may analyze information included in the ticket resolution history to optimize the subject matter experts' use of the ticket solver system (e.g., by identifying likely issues, optimizations, and/or suggested modifications associated with technical solution workflows based on information associated with past tickets, to provide the subject matter experts with assistance in building and maintaining the ticket solver system's knowledgebase).

In this way, an integrated ticket solver system may foster a collaboration, between a customer support team and subject matter experts, to create, maintain, and implement a knowledgebase, which ties technical solution workflows with their associated business process steps, to resolve tickets.

Figure 2:
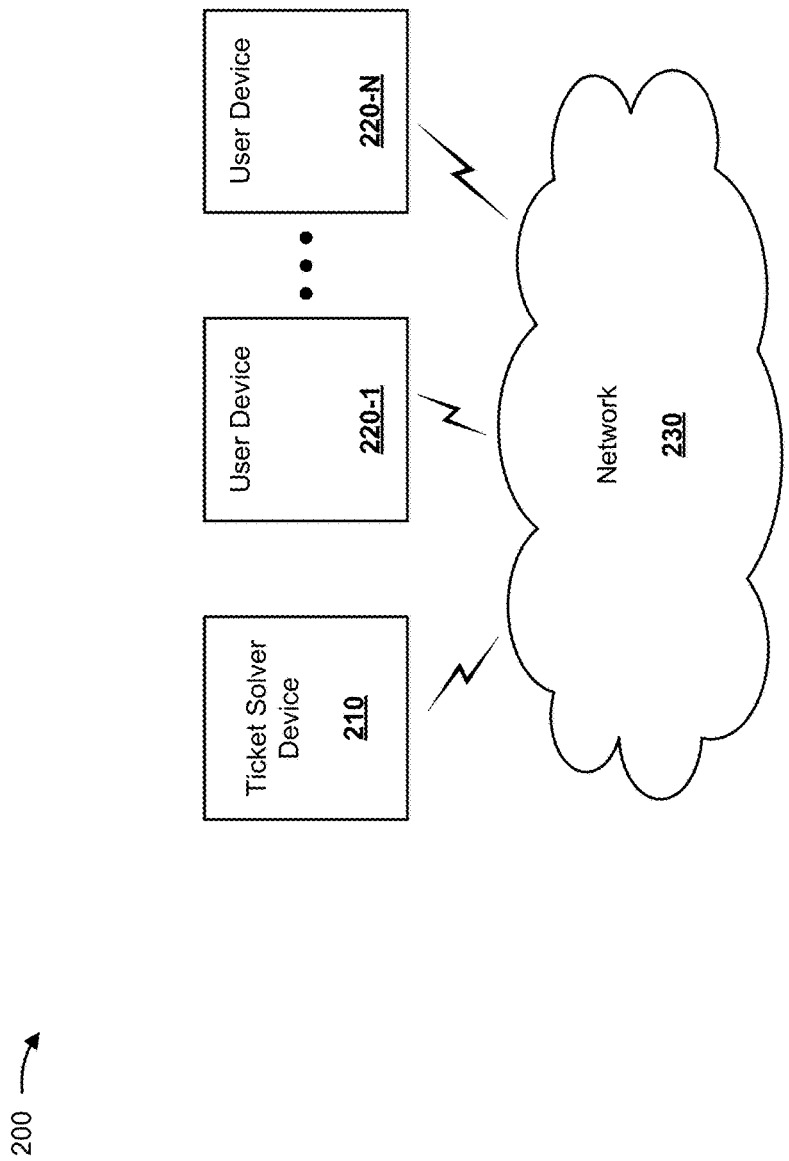
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a ticket solver device 210, a set of user devices 220-1, . . . , 220-N (N≥1; referred to collectively as "user devices 210" and individually as "user device 220"), and a network 230. Devices of environment 200 may interconnect via wired connections, wireless connections, or a combination of wired and wireless connections.

Ticket solver device 210 may include one or more devices capable of storing, processing, and/or routing information associated with creating, managing, and/or resolving tickets. In some implementations, ticket solver device 210 may include a server device, a collection of server devices, or one or more virtual machines operating on one or more host devices in a cloud computing network. In some implementations, ticket solver device 210 may act alone or in combination with one or more other devices to implement a ticket solver system. In some implementations, ticket solver device 210 may include a communication interface that allows ticket solver device 210 to receive information from and/or transmit information to other devices in environment 200. For example, ticket solver device 210 may send information to and/or receive information from user devices 220.

User device 220 may include one or more devices capable of receiving, generating, storing, processing, and/or providing information associated with creating, managing, and/or resolving tickets. For example, user device 220 may include a communication and/or computing device, such as a mobile phone (e.g., a smart phone, a radiotelephone, etc.), a desktop computer, a laptop computer, a tablet computer, a handheld computer, a gaming device, a wearable communication device (e.g., a smart wristwatch, a pair of smart eyeglasses, etc.), a terminal, or a similar type of device. In some implementations, user device 220 may receive information from and/or transmit information to another device in environment 200. For example, user device 220 may send information to and/or receive information from ticket solver device 210.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
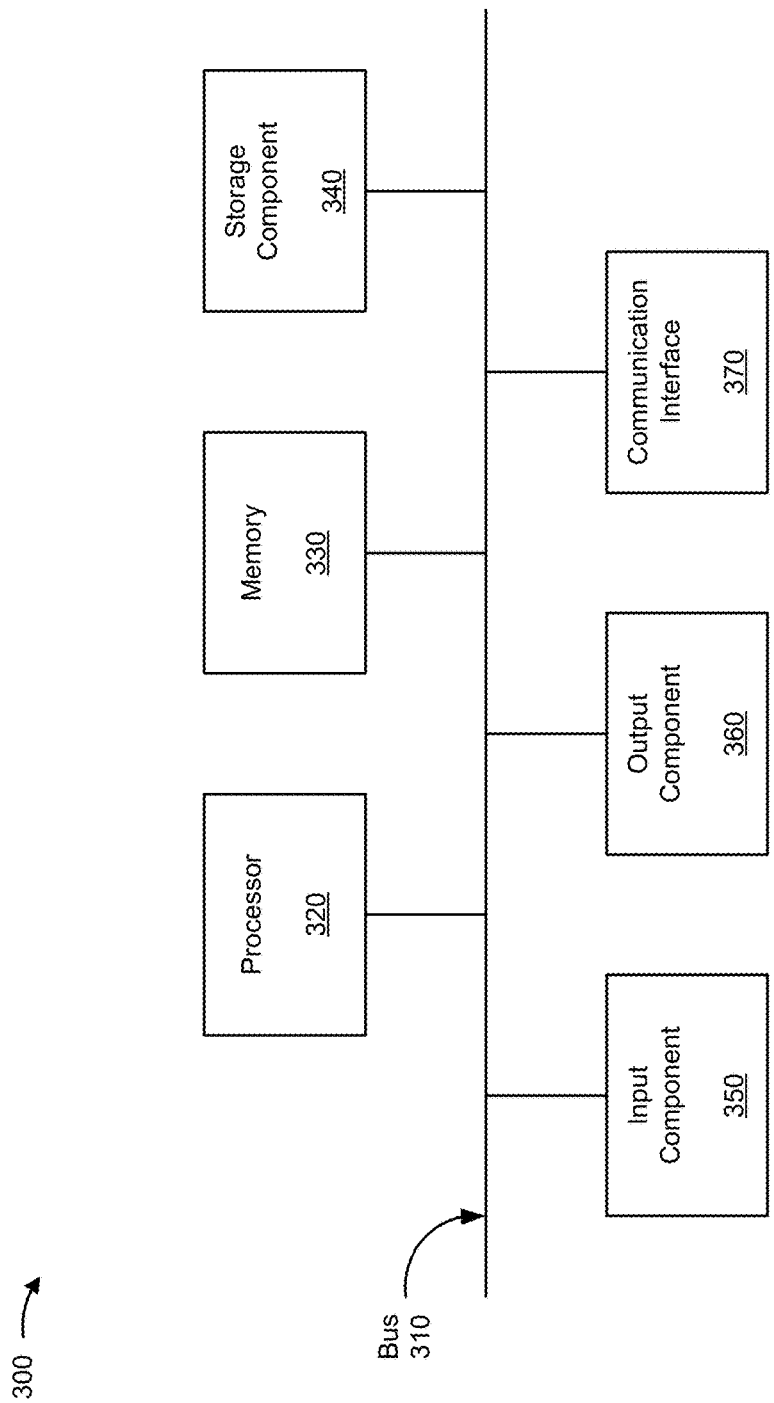
FIG. 3 is a diagram of example components of one or more devices of FIG. 2.

FIG. 3 is a diagram of example components of a device 300. Device 300 may correspond to ticket solver device 210 and/or user device 220. In some implementations, ticket solver device 210 and/or user device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
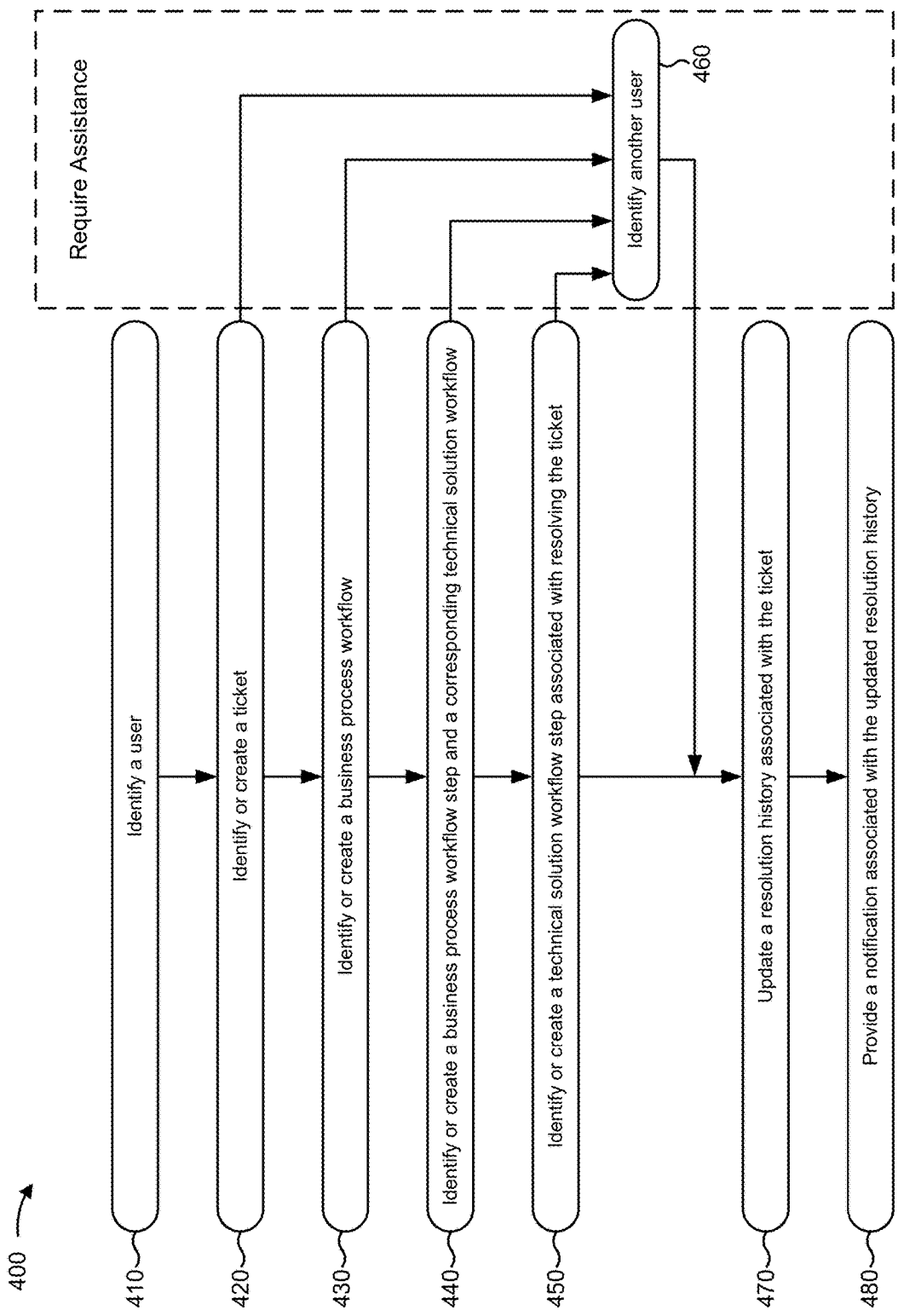
FIG. 4 is a flow chart of an example process for implementing a ticket solver system.

FIG. 4 is a flow chart of an example process 400 for implementing a ticket solver system. In some implementations, one or more process blocks of FIG. 4 may be performed by ticket solver device 210. In some implementations, one or more process blocks of FIG. 4 may be performed by another device or a group of devices separate from or including ticket solver device 210, such as user device 220.

As shown in FIG. 4, process 400 may include identifying a user (block 410). For example, ticker solver device 210 may identify a user associated with user device 220. In some implementations, ticket solver device 210 may receive, from user device 220 and/or another device, information associated with identifying the user. For example, the information may include a user identifier, such as a name, a username, an address, a password, and/or a number (e.g., a telephone number, a customer number, a personal identification number, a registration number, or the like). Alternatively, or additionally, the information may include information associated with user device 220, such as a device identifier (e.g., a network address, a serial number, or the like), a product identifier (e.g., a title, a version, and/or a serial number of a software application), or the like. Alternatively, or additionally, the information may include information maintained by ticket solver device 210 (e.g., a profile associated with the user, a list of authorized users, or the like).

In some implementations, ticket solver device 210 may identify a class associated with the user. For example, ticket solver device 210 may determine a role associated with the user. In some implementations, the user's role may be that of a client seeking assistance with resolving an issue. Alternatively, or additionally, the user's role may be that of a technical support member responsible for suggesting workflow changes and assisting the client and/or another technical support member. Alternatively, or additionally, the user's role may be that of a subject matter expert responsible for assisting technical support members, defining workflows, and committing changes to the ticket solver system. Alternatively, the user's role may be that of a vendor responsible for providing additional applications and/or fixing issues with existing applications. Alternatively, or additionally, ticket solver device 210 may identify a domain associated with the user (e.g., an application, a field of expertise, a skillset, an access level, a company, a geographic area, or the like).

In some implementations, ticket solver device 210 may identify information associated with tailoring a ticket solver system based on identifying the user. For example, ticket solver device 210 may tailor a user interface, associated with the ticket solver system, based on identifying a particular user, user device 220, class, or the like. Alternatively, or additionally, ticket solver device 210 may determine, based on identifying the user, a responsibility, a priority, a personalization, a performance metric, or the like, associated with the user's use of the ticket solver system. By identifying the user, ticket solver device 210 may optimize the operation of ticket solver system by determining a purpose and scope for interactions between ticket solver device 210 and user device 220.

As further shown in FIG. 4, process 400 may include identifying or creating a ticket (block 420). For example, ticket solver device 210 may identify or create a ticket associated with an issue experienced by a client (who may be the user identified in block 410 or may be a different user). A ticket may identify the client and the scope of the issue experienced by the client (e.g., a description of a problem, trouble, failure, and/or complaint associated with an application, such as a software application, used by the client). For example, the ticket may include information associated with diagnosing a cause of the issue (e.g., a debug trace of a software application, responses to diagnosis questions, a message from a client, comments from a user, or the like). Alternatively, or additionally, the ticket may identify one or more users (e.g., the client, a technical support member, a subject matter expert, or the like) associated with managing and/or resolving the ticket and/or an issue associated with the ticket. Alternatively, or additionally, the ticket may identify one or more times associated with the ticket (e.g., a creation time, a deadline time, an assignment time, a resolution time, or the like).

In some implementations, ticket solver device 210 may identify or create the ticket based on receiving information (e.g., from user device 220 via a user interface). For example, ticket solver device 210 may receive information that includes a ticket identifier, or a portion thereof, associated with identifying or creating the ticket. In some implementations, ticket solver device 210 may provide (e.g., to user device 220 via a user interface) information associated with identifying or creating a ticket. For example, ticket solver device 210 may monitor conditions, such as conditions associated with a client's operation of a software application and/or associated with an interaction between a client and the user (e.g., a conversation), and ticket solver device 210 may provide one or more suggestions associated with identifying and/or creating the ticket based on monitoring the conditions. A suggestion may include one or more pre-filled fields associated with creating a new ticket and/or identifying an existing ticket. Alternatively, or additionally, ticket solver device 210 may provide a list of tickets (e.g., tickets associated with the identified user and/or a request from user device 220) from which to select the ticket. Alternatively, or additionally, ticket solver device 210 may identify and/or create a ticket based on the satisfaction of a particular condition and/or threshold. For example, ticket solver device 210 may identify or create the ticket based on determining whether the ticket and/or information associated with the ticket satisfies a condition and/or threshold associated with a search query, an alarm, a notification, a subject matter, a user (e.g., the user), a priority, a seriousness, a scope, another ticket, or the like. By identifying the ticket, ticket solver device 210 may assist the user of user device 220 in registering, managing, tracking, and/or resolving an issue using the ticket solver system.

As further shown in FIG. 4, process 400 may include identifying or creating a business process workflow (block 430). For example, ticket solver device 210 may identify or create a business process workflow associated with the issue experienced by the client. The business process workflow may identify and/or define a particular business process or transaction associated with a client (e.g., a business process and/or transaction implemented by a software application). For example, the business process workflow may include one or more activities associated with performing the process and/or completing the transaction.

In some implementations, ticket solver device 210 may identify or create the business process workflow based on receiving information (e.g., from user device 220 via a user interface). For example, ticket solver device 210 may receive information that includes an identifier (e.g., a name and/or number), or a portion thereof, associated with identifying a particular business process workflow. In some implementations, ticket solver device 210 may provide information (e.g., to user device 220 via a user interface) associated with identifying or creating a business process workflow. For example, ticket solver device 210 may provide a list of existing and/or suggested business process workflows (e.g., based on identifying the user and/or the ticket). Ticket solver device 210 may suggest a business process workflow based on, e.g., business process workflows associated with other tickets (e.g., previously resolved tickets). Alternatively, or additionally, ticket solver device 210 may identify and/or create a business process workflow based on the satisfaction of a particular condition and/or threshold. For example, ticket solver device 210 may identify or create the business process workflow based on determining whether the business process workflow and/or information associated with the business process workflow satisfies a condition and/or threshold associated with a search query, an alarm, a notification, a subject matter, a user (e.g., the user), a priority, a seriousness, a scope, another ticket, or the like.

In some implementations, ticket solver device 210 may create a business process workflow based on receiving information (e.g., from user device 220 via a user interface). For example, ticket solver device 210 may receive user input (e.g., provided by a subject matter expert and/or a client) which defines a business process workflow associated with a particular application and/or client. In some implementations, ticket solver device 210 may provide (e.g., to user device 220 via a user interface) information associated with creating a business process workflow. For example, ticket solver device 210 may provide one or more shell and/or default workflows, based on, e.g., a workflow profile, an existing workflow, and/or information associated with the ticket, from which a particular shell and/default workflow may be chosen and/or modified to create a new business process workflow. Alternatively, or additionally, ticket solver device 210 may provide one or more business process workflow components which may be combined to create a business process workflow (e.g., one or more steps and/or workflows which may be combined into a single workflow). By identifying or creating the business process workflow, ticket solver device 210 may assist the user of user device 220 in resolving an issue and/or updating a knowledgebase using the ticket solver system.

As further shown in FIG. 4, process 400 may include identifying or creating a business process workflow process step and a corresponding technical solution workflow (block 440). For example, ticket solver device 210 may identify or create a step, for the identified business process workflow, associated with the issue experienced by the client. The business process workflow step may identify and/or define a particular activity of the business process or transaction which is associated with the issue experienced by the client (e.g., an activity performed using a software application). The business process workflow step may correspond to an existing technical solution workflow, or ticket solver device 210 may identify or create a new technical solution workflow which corresponds to the business process workflow step. The technical solution workflow may identify and/or define activities associated with a process for resolving the issue experienced by the client in performing the particular business process workflow step.

In some implementations, ticket solver device 210 may identify or create the business process workflow step based on receiving information (e.g., from user device 220 via a user interface). For example, ticket solver device 210 may receive information that includes an identifier (e.g., a name and/or number) associated with identifying a particular business process workflow step. In some implementations, ticket solver device 210 may provide information (e.g., to user device 220 via a user interface) associated with identifying or creating a business process workflow step. For example, ticket solver device 210 may provide a list of existing and/or suggested business process workflow steps (e.g., based on information associated with the user and/or the ticket). Ticket solver device 210 may suggest a business process workflow step based on, e.g., business process workflow steps associated with other tickets (e.g., previously resolved tickets). Alternatively, or additionally, ticket solver device 210 may identify and/or create a business process workflow step based on the satisfaction of a particular condition and/or threshold. For example, ticket solver device 210 may identify or create the business process workflow step based on determining whether the business process workflow step and/or information associated with the business process workflow step satisfies a condition and/or threshold associated with a search query, an alarm, a notification, a subject matter, a user (e.g., the user), a priority, a seriousness, a scope, another ticket, or the like.

In some implementations, ticket solver device 210 may create a business process workflow step based on receiving information (e.g., from user device 220 via a user interface). For example, ticket solver device 210 may receive user input (e.g., provided by a subject matter expert and/or a client) which defines a business process workflow step associated with a particular application and/or client. In some implementations, ticket solver device 210 may provide (e.g., to user device 220 via a user interface) information associated with creating a business process workflow step. For example, ticket solver device 210 may provide one or more shell and/or default workflow steps, based on, e.g., a workflow step profile, an existing workflow step, and/or information associated with the ticket, from which a particular shell and/default workflow step may be chosen and/or modified to create a new business process workflow step.

In some implementations, ticket solver device 210 may identify or create the technical solution workflow based on receiving information (e.g., from user device 220 via a user interface). For example, ticket solver device 210 may receive information that includes an identifier (e.g., a name and/or number), or a portion thereof, associated with identifying a particular technical solution workflow. In some implementations, ticket solver device 210 may provide information (e.g., to user device 220 via a user interface) associated with identifying or creating a technical solution workflow. For example, ticket solver device 210 may provide a list of existing and/or suggested technical solution workflows (e.g., based on identifying the user, the ticket, and/or the business process step). Ticket solver device 210 may suggest a technical solution workflow based on, e.g., technical solution workflows associated with other tickets (e.g., previously resolved tickets). Alternatively, or additionally, ticket solver device 210 may identify and/or create a technical solution workflow based on the satisfaction of a particular condition and/or threshold. For example, ticket solver device 210 may identify or create the technical solution workflow based on determining whether the technical solution workflow and/or information associated with the technical solution workflow satisfies a condition and/or threshold associated with a search query, an alarm, a notification, a subject matter, a user (e.g., the user), a priority, a seriousness, a scope, another ticket, or the like.

In some implementations, ticket solver device 210 may create a technical solution workflow based on receiving information (e.g., from user device 220 via a user interface). For example, ticket solver device 210 may receive user input (e.g., provided by a subject matter expert and/or a client) which defines a technical solution workflow associated with a particular application, client, and/or business process step. In some implementations, ticket solver device 210 may provide (e.g., to user device 220 via a user interface) information associated with creating a technical solution workflow. For example, ticket solver device 210 may provide one or more shell and/or default workflows, based on, e.g., a technical solution profile, an existing technical solution workflow, and/or information associated with the ticket, from which a particular shell and/default workflow may be chosen and/or modified to create a new technical solution workflow. Alternatively, or additionally, ticket solver device 210 may provide one or more technical solution workflow components which may be combined to create a technical solution workflow (e.g., one or more steps and/or workflows which may be combined into a single workflow). By identifying or creating the technical solution workflow, ticket solver device 210 may assist the user of user device 220 in resolving an issue and/or updating a knowledgebase using the ticket solver system.

By identifying or creating the business process workflow step, ticket solver device 210 may assist the user of user device 220 in resolving an issue and/or updating a knowledgebase using the ticket solver system.

As further shown in FIG. 4, process 400 may include identifying or creating a technical solution workflow step associated with resolving the ticket (block 450). For example, ticket solver device 210 may identify or create a step, for the identified technical solution workflow, associated with resolving the issue experienced by the client. The technical solution workflow step may identify and/or define a particular activity of the solution process which is associated with resolving the issue experienced by the client (e.g., an activity which solves the issue experienced by the client).

In some implementations, ticket solver device 210 may identify or create the technical solution workflow step based on receiving information (e.g., from user device 220 via a user interface). For example, ticket solver device 210 may receive information that includes an identifier (e.g., a name and/or number) associated with identifying a particular technical solution workflow step. In some implementations, ticket solver device 210 may provide information (e.g., to user device 220 via a user interface) associated with identifying or creating a technical solution workflow step. For example, ticket solver device 210 may provide a list of existing and/or suggested technical solution workflow steps (e.g., based on information associated with the user and/or the ticket). Ticket solver device 210 may suggest a technical solution workflow step based on, e.g., technical solution workflow steps associated with other tickets (e.g., previously resolved tickets). Alternatively, or additionally, ticket solver device 210 may identify and/or create a technical solution workflow step based on the satisfaction of a particular condition and/or threshold. For example, ticket solver device 210 may identify or create the technical solution workflow step based on determining whether the technical solution workflow step and/or information associated with the technical solution workflow step satisfies a condition and/or threshold associated with a search query, an alarm, a notification, a subject matter, a user (e.g., the user), a priority, a seriousness, a scope, another ticket, or the like.

In some implementations, ticket solver device 210 may create a technical solution workflow step based on receiving information (e.g., from user device 220 via a user interface). For example, ticket solver device 210 may receive user input (e.g., provided by a subject matter expert and/or a client) which defines a technical solution workflow step associated with a particular application and/or client. In some implementations, ticket solver device 210 may provide (e.g., to user device 220 via a user interface) information associated with creating a technical solution workflow step. For example, ticket solver device 210 may provide one or more shell and/or default workflow steps, based on, e.g., a workflow step profile, an existing workflow step, and/or information associated with the ticket, from which a particular shell and/default workflow step may be chosen and/or modified to create a new technical solution workflow step. By identifying or creating the technical solution workflow step, ticket solver device 210 may assist the user of user device 220 in resolving an issue and/or updating a knowledgebase using the ticket solver system.

As further shown in FIG. 4, process 400 may include identifying another user (block 460) if the user requires further assistance (any of blocks 420-450="Require Assistance"). For example, ticket solver device 210 may determine that the user requires assistance identifying and/or creating particular information and may identify another user (e.g., associated with another user device 220) to assist the user with identifying and/or creating the particular information. Alternatively, or additionally, ticket solver device 210 may provide (e.g., to user device 220 via a user interface) a list of other users from which a user of user device 220 may select a particular other user. In some implementations, ticket solver device 210 may identify the other user based on the particular information to be identified and/or created. For example, ticket solver device 210 may identify another user associated with identifying and/or creating the particular information. Alternatively, or additionally, ticket solver device 210 may identify the other user based on information, provided by the user via user device 220, associated with identifying and/or creating the particular information (e.g., based on information provided by user device 220 in an attempt to identify and/or create the particular information). Alternatively, or additionally, ticket solver device 210 may identify the other user based on a suggestion, provided by user device 210, associated with the particular information (e.g., a suggested workflow and/or step). In some implementations, ticket solver device 210 may identify the other user based on information associated with the user and/or the other user. For example, ticket solver device 210 may determine (e.g., based on a user profile associated with the user) that the user (e.g., a client or a support team member) lacks a requisite characteristic (e.g., permission, knowledge, responsibility, or the like) associated with identifying and/or creating the particular information and/or may identify another user based on determining that the other user possesses the requisite characteristic. Alternatively, or additionally, ticket solver device 210 may identify another user based on information contained in other tickets (e.g., previously resolved tickets associated with the other user). In this way, ticket solver device 210 may assist a user with resolving a ticket by identifying another user with knowledge and/or expertise to provide the user with further assistance.

As further shown in FIG. 4, process 400 may include updating a resolution history associated with the ticket (block 470). For example, ticket solver device 210 may update a resolution history to identify an activity, comment, status, or the like associated with the ticket. In some implementations, ticket solver device 210 may update the resolution history based on receiving information (e.g., from user device 220 via a user interface). For example, ticket solver device 210 may receive, from user device 220, information associated with identifying a cause, a workflow, a step, a resolution status, or the like and may update the resolution history based on the received information. By updating the resolution history, ticket solver device 210 may optimize the operation of the ticket solver system by assisting a user, of user device 220, to track the progress of resolving a ticket and/or modifying a knowledgebase associated with the ticket solver system.

As further shown in FIG. 4, process 400 may include providing a notification associated with the updated resolution history (block 480). For example, ticket solver device 210 may provide, to one or more user devices 220, one or more notifications associated with the updated resolution history. In some implementations, ticket solver device 210 may provide a notification (e.g., to one or more user devices 210 via a user interface) based on a particular status of the ticket (e.g., based a particular status, such as resolved, escalated, canceled, overdue, or the like) and/or based on a change in status. Alternatively, or additionally, ticket solver device 210 may provide a notification based on the satisfaction of a threshold associated with the status (e.g., based on expiration of an alarm time). Alternatively, or additionally, ticket solver device 210 may provide a notification based on identifying another user to provide assistance to the user (e.g., by providing a notification to a user device 220 associated with the user and/or to the other user). In some implementations, ticket solver device 210 may provide a notification associated with resolving another ticket. For example, ticket solver device 210 may identify, from the resolution history, a cause and/or solution which may be associated with another ticket, and provide a notification to a user device 220, for display to a user associated with resolving the other ticket. Alternatively, or additionally, ticket solver device 210 may provide a notification, associated with a suggestion for updating a knowledgebase, based on identifying a cause and/or solution associated with one or more tickets. In this way, ticket solver device 210 may assist users of the ticket solver system with managing and resolving tickets by updating the users with notifications based on the ticket resolution history.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5I are diagrams of an example implementation 500 relating to example process 400 shown in FIG. 4. FIGS. 5A-5I show an example of implementing a ticket solver system.

Figure 5A:
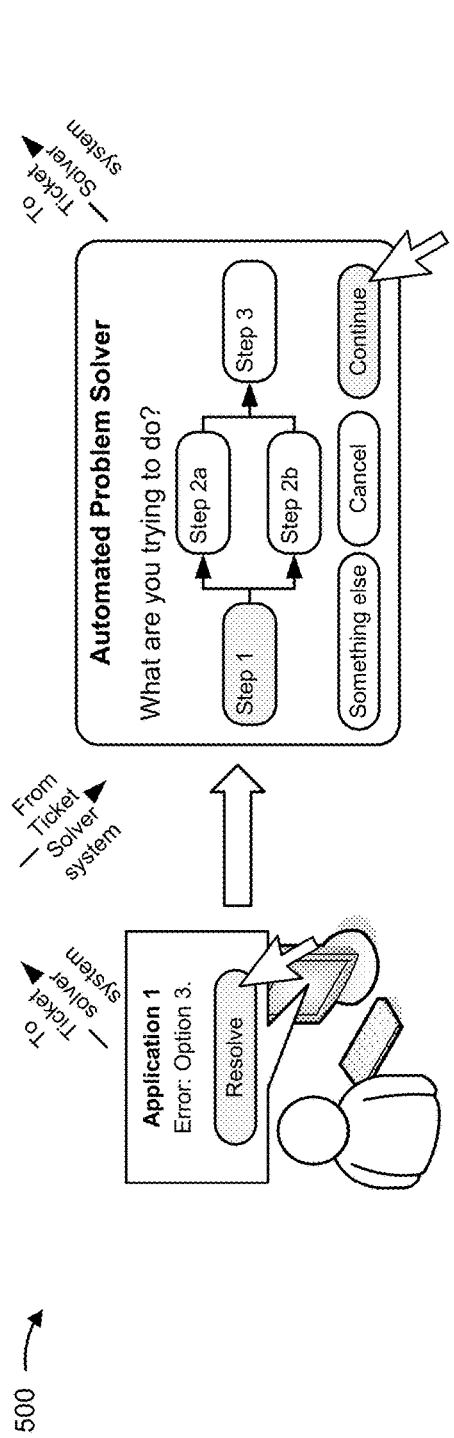

As shown in FIG. 5A, assume, for example implementation 500, that a client, using a user device (e.g., user device 220-1), experiences an issue while using a software application (shown as "Application 1"). Assume further that the issue is associated with an error (identified as "Option 3"). Assume that, based on experiencing the issue, the client initiates a resolution process (e.g., by selecting a button labeled "Resolve"). Based on initiating the resolution process, user device 220-1 sends a request, including information associated with the error, to a ticket solver system (e.g., implemented by ticket solver device 210). Based on receiving the request and the information therein, ticket solver device 210 identifies a user (e.g., a user account associated with an automated problem solver), creates a new ticket, and identifies a business process workflow associated with the client's use of the software application (e.g., "Process 1"). Assume that ticket solver device 210 sends, to user device 220-1, a response, including information associated with selecting a business process workflow step from Process 1.

Based on receiving the response from ticket solver device 210, user device 220-1 presents, for display to the client, a graphical representation of Process 1 and directs the client to provide input associated with identifying a particular business process workflow step associated with the issue (e.g., by selecting from the presented steps and selecting "Continue") or indicating that the issue is not associated with one of the presented business process steps (e.g., by selecting "Something else"). Assume that the client provides input, to user device 220-1, selecting a particular business process workflow step (shown as "Step 1"), and, based on the input, user device 220-1 sends, to ticket solver device 210, a response including information associated with the client's selection.

Figure 5B:
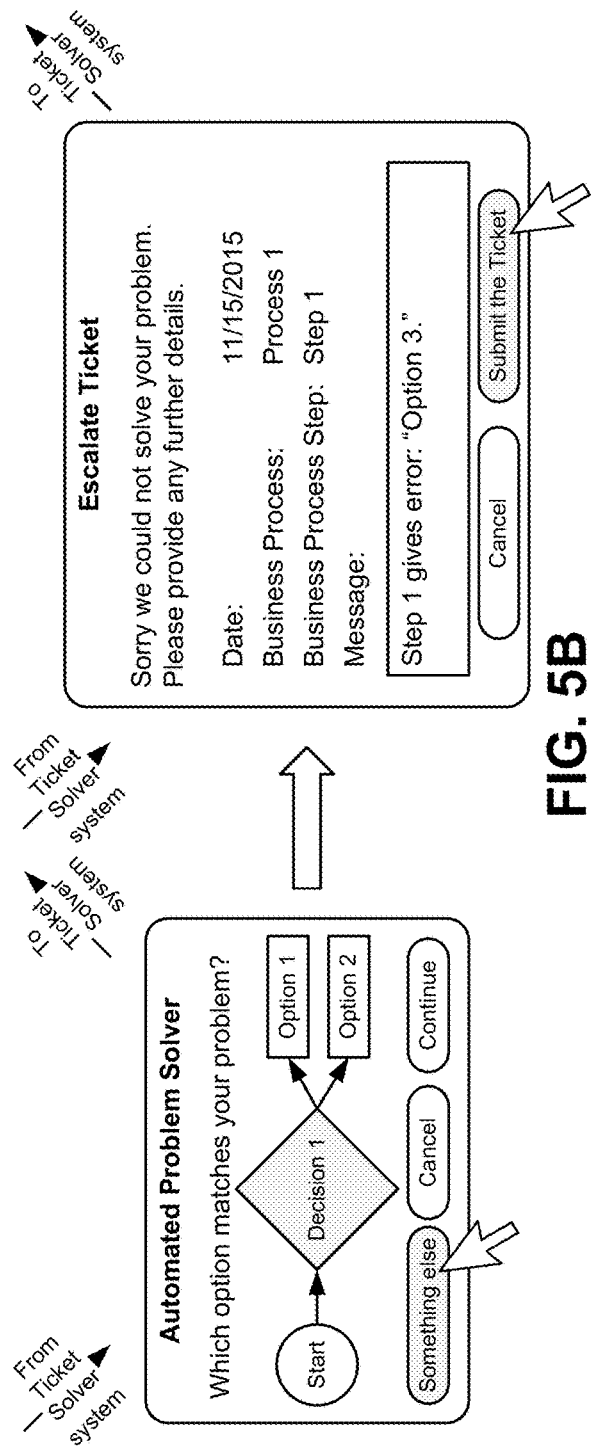

As shown in FIG. 5B, assume, for example implementation 500, that ticket solver device 210 identifies, based on receiving the response from user device 220-1, the business process step selected by the client ("Step 1") and sends, to user device 210-1, a response including information associated with selecting a particular technical solution workflow step from a technical solution workflow corresponding to Step 1.

Based on receiving the response from ticket solver device 210, user device 220-1 presents, for display to the client, a graphical representation of a portion of the technical solution workflow associated with Step 1 and directs the client to provide input associated with identifying a particular technical solution workflow step associated with resolving the issue (e.g., by selecting from the presented steps and selecting "Continue") or indicating that the issue is not associated with one of the presented technical solution workflow steps (e.g., by selecting "Something else"). Assume that the client provides input, to user device 220-1, indicating that the issue is not associated with one of the presented technical solution workflow steps (e.g., by selecting "Something else"), and, based on the input, user device 220-1 sends, to ticket solver device 210, a response including information associated with the client's selection.

Based on receiving the response from user device 220-1, ticket solver device 210 determines that the client is unable to identify a technical solution workflow step. Assume that a user profile, associated with the client, indicates that the client lacks permission to create a new technical solution workflow step. Ticket solver device 210, thus, determines that the client requires further assistance. Based on determining that the client requires further assistance, ticket solver device 210 identifies another user (e.g., a customer support team member identified as "user 1;" see FIGS. 5C-5F), associated with a user profile indicating permission to suggest a new technical solution workflow step, to provide further assistance to the client with resolving the ticket. Assume further that ticket solver device 210 sends, to user device 220-1, a response associated with providing additional information.

Based on receiving the response from ticket solver device 210, user device 210-1 presents, for display to the client, a user interface to direct the client to provide input associated with providing additional information (e.g., "Sorry we could not resolve your problem. Please provide any further details."). Assume that the client provides input directing user device 220-1 to submit a message (e.g., "Step 1 gives error: "Option 3."") to ticket solver device 210 (e.g., by selecting "Submit the Ticket"). Based on the input, user device 220-1 sends, to ticket solver device 210, a response including the message.

As shown in FIG. 5C, assume, for example implementation 500, that ticket solver device 210, based on receiving the response from user device 220-1, updates a resolution history associated with the ticket to include the message and to identify the business process ("Process 1"), the business process step ("Step 1"), a ticket identifier (e.g., "P1-T18"), the user ("Automated"), the other user ("user 1"), a creation date (e.g., "11/15/2014"), and a status (e.g., "New"). Assume further that, based on the updated resolution history, ticket solver device 210 provides a notification, to another user device (e.g., user device 220-2), associated with user 1. Assume that a profile associated with user 1 indicates that user 1 may suggest, but not create, a technical solution workflow step.

Assume that user device 220-2 presents, for display to user 1, a user interface associated with a ticket solver system. Assume that the user interface has been configured, via previous user input provided by user 1 to an upper menu (shown as drop-down menus), to display information associated with tickets of a particular client (e.g., client 1) and a particular software application (e.g., Application 1, shown as "App. 1"). Assume that the user interface has been further configured, via previous user input provided by user 1 to a side menu (shown as buttons for "Business Process," "Notifications," "Search," and "My Tickets"), to display information associated with notifications relating to tickets of client 1 for Application 1.

Assume that the user interface has been further configured, via user input to an input field (shown as a drop-down menu), to display notifications generated within the last week. Assume that, based on the notification received from ticket solver device 210 and previous notifications generated by ticket solver device 210, user device 220-2 presents, for display to user 1 within the user interface, a list of notifications, associated with tickets from client 1 for issues with Application 1, generated within the last week. Assume further that information presented, by user device 220-2 within the list of notifications, is further associated with receiving user input (e.g., selecting a business process, a business process step, a ticket identifier, or a "sent from" user identifier) and presenting, for display to user 1, output associated with the input (e.g., one or more tickets associated with the selected business process, business process step, ticket identifier, or "sent from" user identifier, respectively).

Assume that, based on receiving the notification from ticket solver device 210, the list of notifications includes the notification, received from ticket solver device 210, based on the updated ticket resolution history associated with the ticket of FIGS. 5A-5B. Assume further that the user interface indicates, to user 1, a quantity of previously un-presented notifications (e.g., by displaying a circled number 1 on the side menu button associated with displaying notifications and by displaying arrows and highlighting for the notification within the list of notifications). Assume that user 1 provides, to user device 220-2 via the user interface, input selecting the ticket, associated with the notification sent from ticket solver device 210, by selecting the ticket identifier ("P1-T18") associated with the notification. Based on the input from user 1, user device 220-2 sends, to ticket solver device 210, a request to present the selected ticket.

Figure 5D:
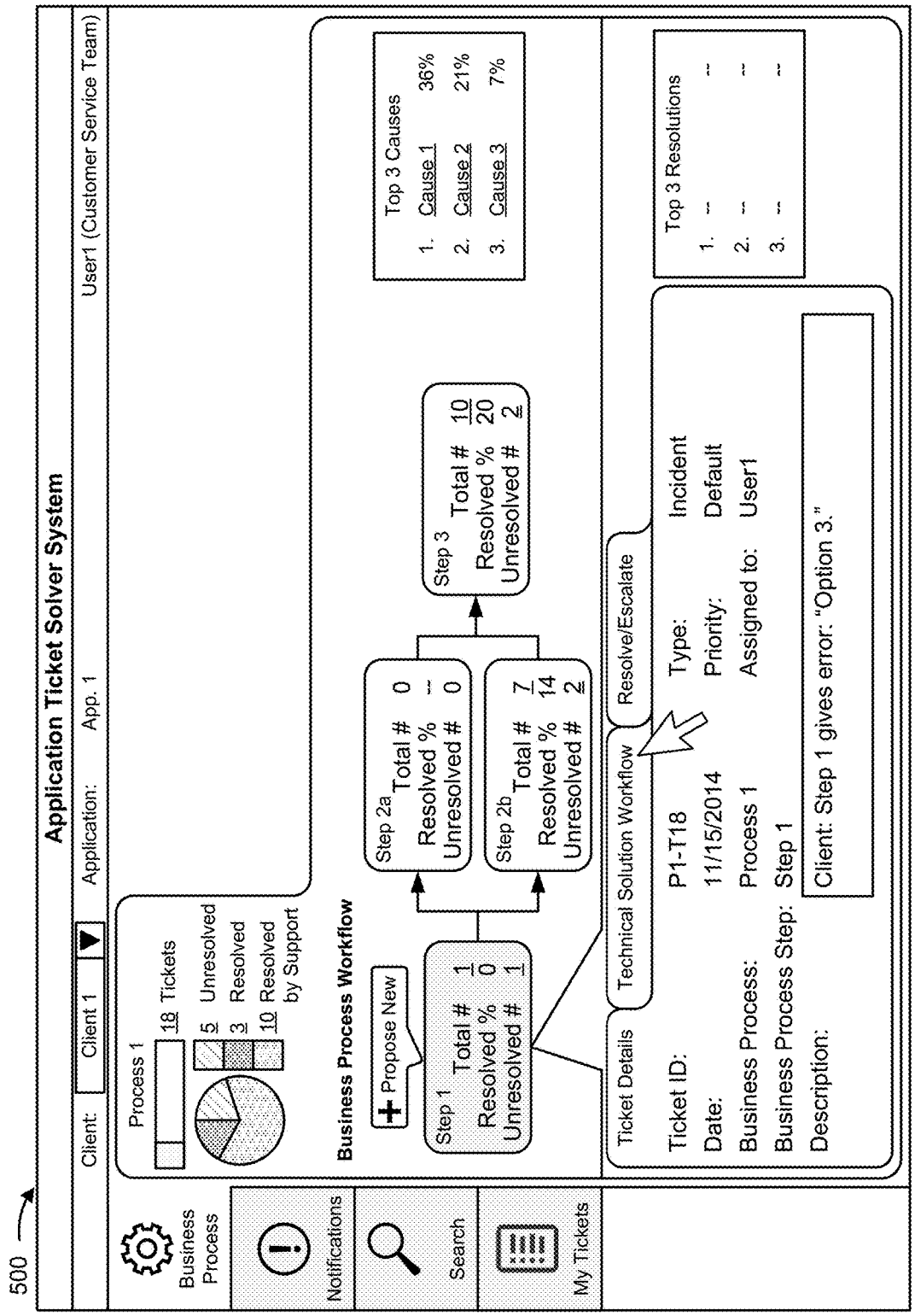

As shown in FIG. 5D, assume, for example implementation 500, that, based on receiving the request from user device 220-2, ticket solver device 210 sends, to user device 220-2, a response including information associated with the ticket. Based on receiving the response, user device 220-2 configures the user interface, via the side menu (shown as buttons), to display information associated with a business process and presents, for display to user 1 via the user interface, information associated with the selected ticket. The information includes a context for the ticket. Assume that the context includes numerical and graphical representations of a total quantity of tickets associated with Client 1 and Process 1 (shown as "18 Tickets"), a quantity of unresolved tickets (shown as "5 Unresolved"), a quantity of tickets resolved by the technical solution workflows without additional support (shown as "3 Resolved"), and a quantity of tickets resolved with additional support (shown as "10 Resolved by Support"). Assume that the context further includes a graphical representation of the business process workflow associated with Process 1, and each step of the graphical representation further identifies a total quantity of tickets associated with that step, a percentage of the total quantity of tickets resolved without additional support, and a quantity of unresolved tickets. The context further identifies likely causes for an issue associated with Process 1 (shown as "Top 3 Causes"), along with a percentage likelihood associated with each likely cause. Assume that the context further identifies Step 1 as being associated with the ticket. Assume that, based on the profile associated with user 1, the user interface presents an option to suggest a modification to the business process workflow (shown as "Propose New"). Because no tickets associated with Step 1 have been resolved, the context includes a place-holder for likely resolutions to an issue associated with Step 1 (shown as "Top 3 Resolutions"), along with a place-holder percentage likelihood associated with each likely cause, to be populated once one or more tickets have been resolved.

Assume that user device 220-2 presents, for display to user 1 within the context of the user interface, a first tab (shown as "Ticket Details") of a tabbed user interface associated with the ticket. The Ticket Details identify the ticket ("P1-T18"), the creation date of the ticket ("11/15/2014"), the business process associated with the ticket ("Process 1"), the business process step associated with the ticket ("Step 1"), a type associated with the ticket (e.g., "Incident"), a priority associated with the ticket (e.g., "Default"), a user assigned to resolve the ticket (e.g., "User 1"), and a description associated with the ticket (e.g., the message provided by the client). Assume that user 1 provides input, to user device 220-2, selecting the second tab (shown as "Technical Solution Workflow") of the tabbed user interface associated with the ticket. Based on the input, user device 220-2 sends, to ticket solver 210, a request associated with presenting the Technical Solution Workflow tab.

As shown in FIG. 5E, assume, for example implementation 500, that, based on receiving the request, ticket solver device 210 provides, to user device 220-2, a response including information associated with the technical solution workflow for the ticket. Based on receiving the response, user device 220-2 presents, for display to user 1, a graphical representation of the technical solution workflow. Assume that user 1 provides input, to user device 220-2, associated with selecting a particular technical solution workflow step (shown as "Decision 1"). Based on the selection, user device 220-2 presents, for display to user 1, an option associated with proposing a new technical solution workflow step (shown as "Propose New"). Assume that user 1 provides input, to user device 220-2, identifying a new technical solution workflow step (shown as "Option 3") and selecting the third tab (shown as "Resolve/Escalate") of the tabbed user interface associated with the ticket. Based on the input, user device 220-2 sends, to ticket solver 210, a request associated with creating a new technical solution workflow step and presenting the Resolve/Escalate tab.

As shown in FIG. 5F, assume, for example implementation 500, that based on receiving the request, ticket solver device 210 provides, to user device 220-2, a response including information associated with the suggested technical solution workflow step (e.g., "Option 1") resolving and/or escalating the ticket. Based on receiving the response, user device 220-2 presents, for display to user 1, a user interface for updating the resolution history associated with the ticket. Assume that user 1 provides input, to user device 220-2, associated with identifying a to-date cumulative resolution duration (e.g., 30 minutes since the ticket was opened), an effort (e.g., 10 minutes spent resolving the ticket), comments (e.g., "Propose adding Option 3."), and an action to perform (e.g., "Escalate"). Assume further that user 1 directs user device 220-2 to submit the information (e.g., via a "Submit" button), and user device 220-2 provides a response, based on the input, to ticket solver device 210.

Figure 5G:
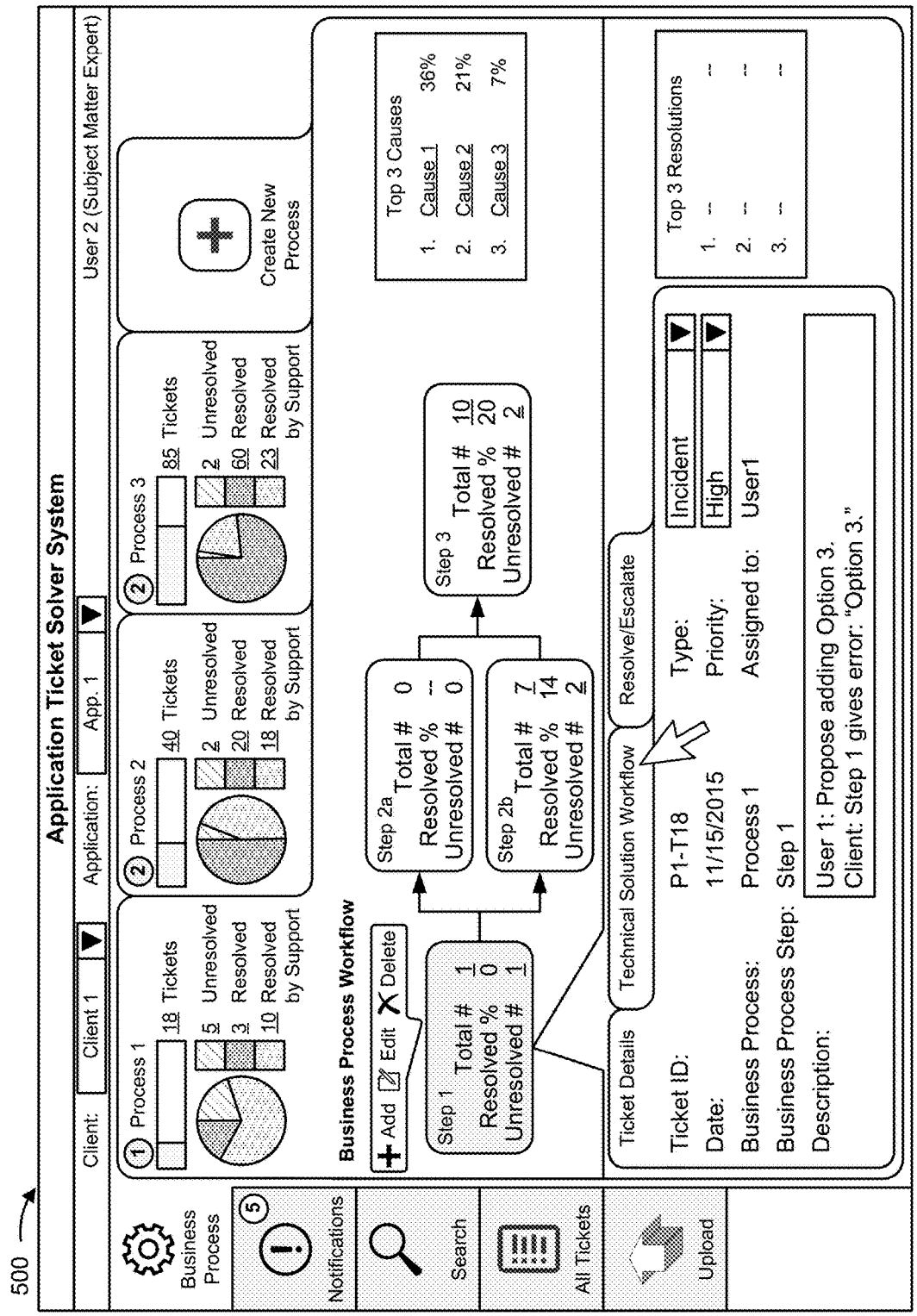

As shown in FIG. 5G, assume, for example implementation 500, that, based on the response received from user device 220-2, ticket solver device 210 identifies another user (e.g., a subject matter expert identified as "user 2;" see FIGS. 5G-5F), associated with a user profile indicating permission to create and approve new technical solution workflow steps, to provide further assistance to user 1 with resolving the ticket. Assume further that ticket solver device 210 updates a resolution history associated with the ticket, based on the information provided by user device 220-2. Assume further that, based on the updated resolution history, ticket solver device 210 sends, to another user device associated with user 2 (e.g., user device 220-3), a notification based on the updated resolution history.

Assume that user device 220-3 presents, for display to user 2, a user interface associated with the ticket solver system. The user interface may include the same or similar information as the user interface, associated with user device 220-2, described with respect to FIG. 5D. However, the user interface includes additional information, provided by ticket solver device 210, based on the profile associated with user 2. Rather than "My Tickets," the side menu displayed by the user interface includes an option for "All Tickets" (e.g., based on user 2's profile identifying permission to view a greater scope of tickets). The side menu also includes an "Upload" option for importing information into the ticket solver system (e.g., workflow definitions, additional tickets, or the like).

Like the user interface presented to user 1 by user device 220-2, the user interface presented to user 2 by user device 220-3 includes a first tab associated with Process 1. However, the user interface presented by user device 220-3 includes, based on the user profile associated with user 2, additional tabs for other business processes associated with Application 1, including existing processes (shown as "Process 2" and "Process 3") and an option to create a new process. Like the tab for Process 1, the additional tabs, associated with the existing processes, present numerical and graphical information associated with a general status of tickets for the existing processes. The additional tabs are selectable, via user input, to display a context associated with tickets of the existing processes and a tabbed user interface associated with specific tickets. Each tab identifies a quantity of notifications, based on the ticket resolution history, which are selectable to provide information associated with the notifications (e.g., to open the notifications tab from the side menu to view notifications or to activate a tabbed user interface associated with a particular ticket corresponding to a notification).

Assume that user 2 selects, via user input to the user interface, the tab associated with Process 1 and further selects Step 1 from the business process workflow associated with Process 1. Like the user interface presented to user 1 by user device 220-2, the user interface presents, to user 2, a tabbed user interface associated with the ticket P1-T18. However, within the "Ticket Details" tab, user 2 is presented with an updated description, based on the updated ticket resolution history, which includes the message provided by user 1 as well as the message provided by the client. Further, the user interface presents additional options, based on the user profile associated with user 2, for modifying a type and priority associated with the ticket. Assume that user 2 provides input, to user device 220-3, selecting the second tab (shown as "Technical Solution Workflow") of the tabbed user interface associated with the ticket. Based on the input, user device 220-3 sends, to ticket solver device 210, a request associated with presenting the Technical Solution Workflow tab.

As shown in FIG. 5H, assume, for example implementation 500, that, based on receiving the request, ticket solver device 210 provides, to user device 220-3, a response including information associated with the technical solution workflow for the ticket. Based on receiving the response, user device 220-3 presents, for display to user 2, a graphical representation of the technical solution workflow, including "Option 3" proposed by user 1. Assume that user 2 provides input, to user device 220-3, associated with selecting the proposed "Option 3." Based on the selection, user device 220-3 presents, for display to user 2, an option associated with adding to, editing, or rejecting the proposed technical solution workflow step (shown as "Add/Edit/Reject"). Assume that user 2 provides input, to user device 220-3, adding a new technical solution workflow step (shown as "Step 1") and selecting the third tab (shown as "Resolve/Escalate") of the tabbed user interface associated with the ticket. Based on the input, user device 220-3 sends, to ticket solver 210, a request associated with confirming the proposed technical solution workflow step ("Option 3"), creating a new technical solution workflow step ("Step 1"), and presenting the Resolve/Escalate tab.

As shown in FIG. 5I, assume, for example implementation 500, that based on receiving the request, ticket solver device 210 provides, to user device 220-3, a response including information associated with the new technical solution workflow step (e.g., "Step 1") resolving and/or escalating the ticket. Based on receiving the response, user device 220-3 presents, for display to user 2, a user interface for updating the resolution history associated with the ticket. Assume that user 2 provides input, to user device 220-3, associated with identifying a resolution step (e.g., "Step 1"), a cause (e.g., "Cause 2"), a to-date cumulative resolution duration (e.g., 60 minutes since the ticket was opened), an effort (e.g., 45 minutes spent resolving the ticket), comments (e.g., "Confirmed Option 3. Added Step 1."), and an action to perform (e.g., "Resolved (by Support)"). Assume further that user 2 directs user device 220-3 to submit the information (e.g., via a "Submit" button), and user device 220-3 provides a response, based on the input, to ticket solver device 210.

Assume further that, based on the response received from user device 220-3, ticket solver device 210 updates the resolution history associated with the ticket. Assume further that, based on the updated resolution history, ticket solver device 210 sends, to user devices 220-1 and 220-2, notifications based on the updated resolution history (e.g., identifying the ticket's status as resolved and providing the updated technical solution workflow).

As indicated above, FIGS. 5A-5I are provided merely as an example. Other examples are possible and may differ from what was described with regard to FIGS. 5A-5I.

Implementations described herein may assist users of a ticket solver system with building and using a knowledgebase for resolving tickets associated with issues with business processes (e.g., implemented by applications). By structuring and presenting, graphically, the knowledgebase as a collection of business process workflows, corresponding to the business processes, and technical solution workflows, corresponding to the business process workflow steps, users of the ticket solver system may more efficiently resolve tickets and update the knowledgebase.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-readable medium storing instructions, the instructions comprising:
   one or more instructions that, when executed by one or more processors, cause the one or more processors to:
      tailor a user interface based on identifying at least one of:
         a particular user,
         a particular user device, or
         a class associated with the particular user;
      monitor a usage of an application;
      determine whether one or more conditions, associated with the usage of the application, is satisfied;
      generate a ticket based on the one or more conditions being satisfied;
      output, via the tailored user interface, first output information based on generating the ticket,
         the first output information being associated with presenting a business process workflow;
      receive, via the tailored user interface and based on outputting the first output information, first input information,
         the first input information being associated with identifying:
            an issue associated with using the application to implement a business process,
            the business process,
            a process step associated with implementing the business process, and
            a resolution step associated with implementing a technical solution workflow;
      generate the business process workflow, corresponding to the business process, based on receiving, via the tailored user interface, the first input information and based on the one or conditions being satisfied;
      output, via the tailored user interface, second output information,
         the second output information being associated with presenting the technical solution workflow, and
         the technical solution workflow being generated based on the first input information;
      receive, via the tailored user interface, second input information,
         the second input information being associated with identifying the resolution step based on outputting the second output information;
      generate the technical solution workflow, corresponding to the process step associated with implementing the business process, based on receiving, via the tailored user interface, the second input information and based on the one or conditions being satisfied;
      update a resolution history based on generating the technical solution workflow,
         the resolution history identifying:
            the issue,
            the business process,
            the process step,
            the technical solution workflow, and
            the resolution step; and
      update a knowledgebase based on updating the resolution history,
         the updated knowledgebase including one or more steps of the technical solution workflow.

2. The computer-readable medium of claim 1, where the one or more instructions, when executed by the one or more processors, further cause the one or more processors to:
   generate, based on updating the resolution history, a notification associated with the issue; and
   output, via the tailored user interface, the notification.

3. The computer-readable medium of claim 1, where the one or more instructions, when executed by the one or more, further cause the one or more processors to:
   generate, based on the resolution history, a notification,
      the notification being associated with identifying one or more causes associated with the issue, and
      the first input information being based on the notification.

4. The computer-readable medium of claim 1, where the one or more instructions, when executed by the one or more processors, further cause the one or more processors to:
   identify, based on the knowledgebase, a group of technical steps associated with implementing the technical solution workflow; and
   identify, based on the second input information, one or more additional technical steps associated with implementing the technical solution workflow, the one or more additional technical steps including the resolution step; and where the one or more instructions, that cause the one or more processors to generate the technical solution workflow, cause the one or more processors to:
generate the technical solution workflow based on identifying the group of technical steps and the one or more additional technical steps.

5. The computer-readable medium of claim 4, where the one or more instructions, that cause the one or more processors to update the resolution history, cause the one or more processors to:
update the resolution history to identify the one or more additional technical steps as proposed technical steps;
where the one or more instructions, when executed by the one or more processors, further cause the one or more processors to:
output, via the tailored user interface, a notification, identifying the one or more additional technical steps, based on identifying the one or more additional technical steps as the proposed technical steps; and
receive, via the tailored user interface, a request associated with identifying one or more of the proposed technical steps as confirmed technical steps; and
where the one or more instructions, that cause the one or more processors to update the knowledgebase, cause the one or more processors to:
update the knowledgebase based on the request,
the knowledgebase identifying an updated group of technical steps associated with implementing the technical solution workflow, and
the updated group of technical steps including the confirmed technical steps.

6. The computer-readable medium of claim 1, where the one or more instructions, when executed by the one or more processors, further cause the one or more processors to:
identify, based on the knowledgebase, a group of process steps associated with implementing the business process; and
identify, based on the first input information, one or more additional process steps associated with implementing the business process,
the one or more additional process steps including the process step; and
where the one or more instructions, that cause the one or more processors to generate the business process workflow, cause the one or more processors to:
generate the business process workflow based on identifying the group of process steps and the one or more additional process steps.

7. The computer-readable medium of claim 1, where the first output information identifies existing business process workflows.

8. A method, comprising:
tailoring, by a device, a user interface based on identifying at least one of:
a particular user,
a particular user device, or
a class associated with the particular user;
monitoring, by the device, a usage of an application;
determining, by the device, whether one or more conditions, associated with the usage of the application, is satisfied;
generating, by the device, a ticket based on the one or more conditions being satisfied;
outputting, by the device via the tailored user interface, first output information based on generating the ticket,
the first output information being associated with presenting a business process workflow;
receiving, by the device via the tailored user interface and based on outputting the first output information, first input information,
the first input information being associated with identifying:
an issue associated with using the application to implement a business process,
the business process,
a process step associated with implementing the business process, and
a resolution step associated with implementing a technical solution workflow;
generating, by the device based on receiving, via the tailored user interface, the first input information and based on the one or more conditions being satisfied, the business process workflow corresponding to the business process;
outputting, by the device via the tailored user interface, second output information,
the second output information being associated with presenting the technical solution workflow, and
the technical solution workflow being generated based on the first input information;
receiving, by the device via the tailored user interface, second input information,
the second input information being associated with identifying the resolution step based on outputting the second output information;
generating, by the device based on receiving, via the tailored user interface, the second input information and based on the one or more conditions being satisfied, the technical solution workflow corresponding to the process step associated with implementing the business process;
updating, by the device based on generating the technical solution workflow, a resolution history,
the resolution history identifying:
the issue,
the business process,
the process step,
the technical solution workflow, and
the resolution step; and
updating, by the device based on updating the resolution history, a knowledgebase,
the updated knowledgebase including one or more steps of the technical solution workflow.

9. The method of claim 8, further comprising:
generating, based on updating the resolution history, a notification associated with the issue; and
outputting, via the tailored user interface, the notification.

10. The method of claim 8, further comprising:
generating, based on the resolution history, a notification,
the notification being associated with identifying one or more causes associated with the issue, and
the first input information being based on the notification.

11. The method of claim 8, further comprising:
identifying, based on the knowledgebase, a group of technical steps associated with implementing the technical solution workflow; and
identifying, based on the second input information, one or more additional technical steps associated with implementing the technical solution workflow, the one or more additional technical steps including the resolution step; and where generating the technical solution workflow comprises:

generating the technical solution workflow based on identifying the group of technical steps and the one or more additional technical steps.

12. The method of claim 11, where updating the resolution history comprises:

updating the resolution history to identify the one or more additional technical steps as proposed technical steps;

where the method further comprises:

outputting, via the tailored user interface, a notification, identifying the one or more additional technical steps, based on identifying the one or more additional technical steps as the proposed technical steps; and receiving, via the tailored user interface, a request associated with identifying one or more of the proposed technical steps as confirmed technical steps; and where updating the knowledgebase comprises:

updating the knowledgebase based on the request,
the knowledgebase identifying an updated group of technical steps associated with implementing the technical solution workflow, and
the updated group of technical steps including the confirmed technical steps.

13. The method of claim 8, further comprising:

identifying, based on the knowledgebase, a group of process steps associated with implementing the business process; and identifying, based on the first input information, one or more additional process steps associated with implementing the business process,
the one or more additional process steps including the process step; and where generating the business process workflow comprises:

generating the business process workflow based on identifying the group of process steps and the one or more additional process steps.

14. The method of claim 8, where the first output information identifies existing business process workflows.

15. A device, comprising:

a memory; and
one or more processors to:
tailor a user interface based on identifying at least one of:
a particular user,
a particular user device, or
a class associated with the particular user;
monitor a usage of an application;
determine whether one or more conditions, associated with the usage of the application, is satisfied;
generate a ticket based on the one or more conditions being satisfied;
output, via the tailored user interface, first output information based on generating the ticket,
the first output information being associated with presenting a business process workflow;
receive, via the tailored user interface and based on outputting the first output information, first input information,
the first input information being associated with identifying:

an issue associated with using the application to implement a business process,
the business process,
a process step associated with implementing the business process, and
a resolution step associated with implementing a technical solution workflow;
generate the business process workflow, corresponding to the business process, based on receiving, via the tailored user interface, the first input information and based on the one or more conditions being satisfied;
output, via the tailored user interface, second output information,
the second output information being associated with presenting the technical solution workflow, and
the technical solution workflow being generated based on the first input information;
receive, via the tailored user interface, second input information,
the second input information being associated with identifying the resolution step based on outputting the second output information;
generate the technical solution workflow, corresponding to the process step associated with implementing the business process, based on receiving, via the tailored user interface, the second input information and based on the one or more conditions being satisfied;
update a resolution history based on generating the technical solution workflow,
the resolution history identifying:
the issue,
the business process,
the process step,
the technical solution workflow, and
the resolution step; and
update a knowledgebase based on updating the resolution history,
the updated knowledgebase including one or more steps of the technical solution workflow.

16. The device of claim 15, where the one or more processors are further to:

generate, based on updating the resolution history, a notification associated with the issue; and
output, via the tailored user interface, the notification.

17. The device of claim 15, where the one or more processors are further to:

generate, based on the resolution history, a notification,
the notification being associated with identifying one or more causes associated with the issue, and
the first input information being based on the notification.

18. The device of claim 15, where the one or more processors are further to:

identify, based on the knowledgebase, a group of technical steps associated with implementing the technical solution workflow; and
identify, based on the second input information, one or more additional technical steps associated with implementing the technical solution workflow,
the one or more additional technical steps including the resolution step; and where the one or more processors, when generating the technical solution workflow, are to:

generate the technical solution workflow based on identifying the group of technical steps and the one or more additional technical steps.

19. The device of claim 18, where the one or more processors, when updating the resolution history, are to:
    update the resolution history to identify the one or more additional technical steps as proposed technical steps;
    where the one or more processors are further to:
        output, via the tailored user interface, a notification, identifying the one or more additional technical steps, based on identifying the one or more additional technical steps as the proposed technical steps; and
        receive, via the tailored user interface, a request associated with identifying one or more of the proposed technical steps as confirmed technical steps; and
    where the one or more processors, when updating the knowledgebase, are to:
        update the knowledgebase based on the request,
            the knowledgebase identifying an updated group of technical steps associated with implementing the technical solution workflow, and
            the updated group of technical steps including the confirmed technical steps.

20. The device of claim 15, where the first output information identifies existing business process workflows.

\* \* \* \* \*